(12) United States Patent
Chen

(10) Patent No.: US 8,615,378 B2
(45) Date of Patent: Dec. 24, 2013

(54) SYSTEMS, METHODS, AND LOGIC FOR GENERATING STATISTICAL RESEARCH INFORMATION

(75) Inventor: Steve X. Chen, Newton, MA (US)

(73) Assignee: X&Y Solutions, Newton, MA (US)

( * ) Notice: Subject to any disclaimer, the term of this patent is extended or adjusted under 35 U.S.C. 154(b) by 392 days.

(21) Appl. No.: 13/078,408

(22) Filed: Apr. 1, 2011

(65) Prior Publication Data

US 2011/0246135 A1  Oct. 6, 2011

Related U.S. Application Data

(60) Provisional application No. 61/320,894, filed on Apr. 5, 2010, provisional application No. 61/367,965, filed on Jul. 27, 2010.

(51) Int. Cl.
 *G06F 17/18* (2006.01)
 *G06F 11/30* (2006.01)
(52) U.S. Cl.
 USPC ............ 702/179; 702/180; 702/181; 702/182
(58) Field of Classification Search
 USPC ................................ 702/179–182, 121–123
 See application file for complete search history.

(56) References Cited

U.S. PATENT DOCUMENTS

| | | | |
|---|---|---|---|
| 6,144,954 A | 11/2000 | Li | |
| 6,178,382 B1 | 1/2001 | Roederer et al. | |
| 7,079,993 B2 | 7/2006 | Stephenson et al. | |
| 7,152,212 B2 | 12/2006 | McMahan | |
| 7,225,113 B2 | 5/2007 | Rothschild | |
| 7,231,631 B1 | 6/2007 | Branch Freeman et al. | |
| 7,272,586 B2 | 9/2007 | Nauck et al. | |
| 7,684,892 B2 | 3/2010 | Yuan et al. | |
| 2002/0040273 A1 | 4/2002 | John et al. | |
| 2002/0047865 A1 | 4/2002 | Bozionek et al. | |
| 2003/0023951 A1 | 1/2003 | Rosenberg | |

(Continued)

FOREIGN PATENT DOCUMENTS

| | | |
|---|---|---|
| DE | 10213174 | 10/2003 |
| EP | 0678809 | 10/1995 |

(Continued)

OTHER PUBLICATIONS

International Search Report and Written Opinion mailed on Nov. 17, 2011, for International Application No. PCT/US2011/030936 filed Apr. 1, 2011, 8 pages.

*Primary Examiner* — Phuong Huynh
(74) *Attorney, Agent, or Firm* — Wilmer Cutler Pickering Hale and Dorr LLP

(57) ABSTRACT

In one embodiment, a system for generating a statistical analysis output is disclosed. The system receives and processes input from a user to perform statistical analysis and generate an output. The input includes at least one statistical variable from a plurality of statistical variables in a dataset, statistical modules adopted for analysis, and output formats. The system includes a processing unit configured to: automatically identify statistical variables in the dataset; automatically generate a program code for obtaining a variable distribution; select at least one statistical variable for statistical analysis; select one or more of the at least one statistical variable and automatically generate programs that implement the statistical functions for manipulating the variables; automatically perform statistical analysis based on the statistical modules by executing program codes associated with the modules; and automatically generate a program code for organizing outcomes of the statistical analysis into the user selected output formats.

20 Claims, 6 Drawing Sheets

(56) References Cited

U.S. PATENT DOCUMENTS

| | | |
|---|---|---|
| 2004/0030667 A1 | 2/2004 | Xu et al. |
| 2004/0049729 A1* | 3/2004 | Penfield ........................ 715/503 |
| 2004/0172409 A1 | 9/2004 | James |
| 2006/0161403 A1 | 7/2006 | Jiang et al. |
| 2006/0293763 A1* | 12/2006 | Rivard ............................. 700/2 |
| 2007/0156479 A1 | 7/2007 | Long |
| 2007/0198927 A1 | 8/2007 | Sukendro |

FOREIGN PATENT DOCUMENTS

| | | |
|---|---|---|
| JP | 11212988 | 8/1999 |
| KR | 2001-0076998 | 8/2001 |
| KR | 2002-0022161 | 3/2002 |
| WO | WO-02/054171 | 7/2002 |

* cited by examiner

FIG. 4

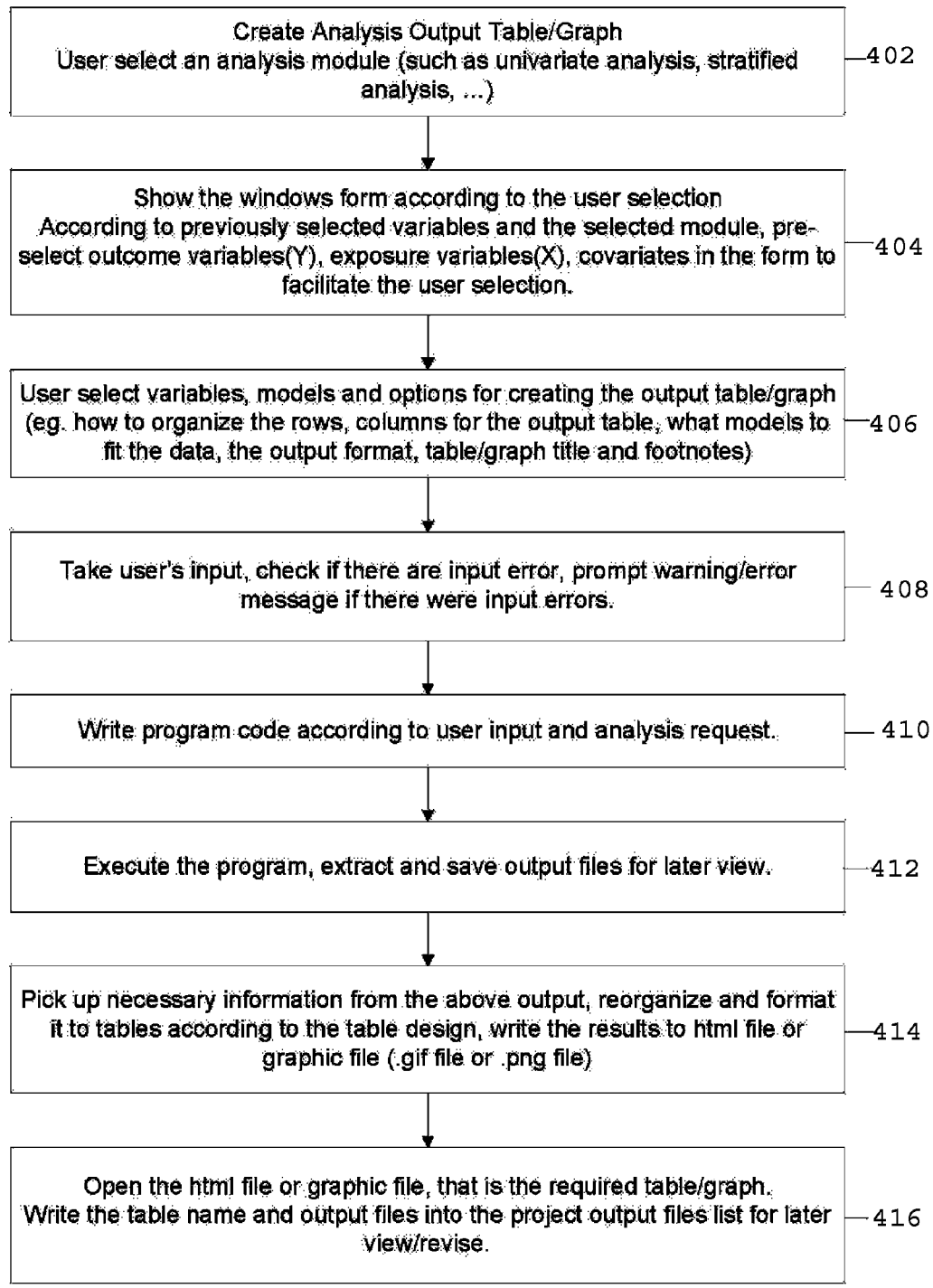

- Create Analysis Output Table/Graph
  User select an analysis module (such as univariate analysis, stratified analysis, ...) — 402
- Show the windows form according to the user selection
  According to previously selected variables and the selected module, pre-select outcome variables(Y), exposure variables(X), covariates in the form to facilitate the user selection. — 404
- User select variables, models and options for creating the output table/graph (eg. how to organize the rows, columns for the output table, what models to fit the data, the output format, table/graph title and footnotes) — 406
- Take user's input, check if there are input error, prompt warning/error message if there were input errors. — 408
- Write program code according to user input and analysis request. — 410
- Execute the program, extract and save output files for later view. — 412
- Pick up necessary information from the above output, reorganize and format it to tables according to the table design, write the results to html file or graphic file (.gif file or .png file) — 414
- Open the html file or graphic file, that is the required table/graph. Write the table name and output files into the project output files list for later view/revise. — 416

400

SYSTEMS, METHODS, AND LOGIC FOR GENERATING STATISTICAL RESEARCH INFORMATION

CROSS-REFERENCE TO RELATED APPLICATIONS

This application claims the benefit under 35 U.S.C. §119(e) of U.S. Provisional Patent Application No. 61/367,965, filed Jul. 27, 2010 and U.S. Provisional Patent Application No. 61/320,894, filed Apr. 5, 2010, each of which is hereby incorporated by reference herein in its entirety.

BACKGROUND

A dataset is similar to a spreadsheet in concept and comprises rows and columns. Each row is called an observation and represents a subject. Each column is called a variable and represents a feature, trait, or measurement related to the subject. Subject ID is a special variable that is used to identify each subject, such as a patient in a clinical research.

A distribution of a variable is a basic statistical description of the variable. For a continuous variable, such as a subject's height in inches, the common statistics of interest include means, standard deviation, minimum, maximum, median, and various percentile ranks, such as 10 percentile, 25 percentile, etc. For a discrete, or categorical, variable, such as gender and race, the common statistics of interest include the counts for each of the discrete categories.

A regression model is a statistical formula that uses independent variables, referred to as Exposures and Covariates, to predict a dependent variable of interest, referred to as Outcome. The following formula is an example of a regression model:

$$f(SBP), \text{where } SBP = \beta_0 + \beta_1 * AGE + \beta_2 * BMI + e$$

SBP is the Outcome of the regression model and represents systolic blood pressure of subject patients. AGE is an independent variable and represents the age of the patients. BMI is also an independent variable and represents the body mass index of the patients.

An Exposure is an independent variable in a regression model whose variation is observed to determine how it influences the variation of the Outcome. A Covariate, or adjusting variable, is also an independent variable in a regression model that is not an Exposure. In the exemplary regression model, for example, the BMI is a Covariate of the AGE and vice versa. Either of the two or both independent variables can be selected as an Exposure.

A regression coefficient is a constant that represents the rate of change of an Exposure as a function of changes in the Outcome. In the exemplary regression model, for example, $\beta_1$ and $\beta_2$ are the regression coefficients associated with the AGE and BMI variables, respectively. If $\beta_2$ is equal to zero, for instance, it means that there is no correlation between the changes in BMI and the changes in SBP. A regression coefficient shows an extent to which a variable associated with the coefficient is correlated with the Outcome of a regression model.

A variable is said to be associated with another variable if the changes of the two variables are found to be correlated. An association test involves fitting and testing a regression model to determine regression coefficients to see if any of them carries significant correlation with respect to the Outcome. Epidemiological data analysis, for example, focus on the association of Exposures with an Outcome wherein the association is tested with and without adjusting other Covariates.

Stratification is defined as the process of partitioning data into distinct or non-overlapping groups. Stratification is used when a study population's sub-domains are of particular interest. A stratified variable is a variable that represents a measurement obtained from a partitioned group of a study population.

Statistical tools presently available in the prior art are rigidly designed around statistical methods rather than the ease of obtaining data analysis outputs. Users (e.g., epidemiologists), for instance, have to do a lot of programming in order to apply the statistical methods to analyze available data, extract the relevant information from the outputs of such tools, and put the information into a report.

SUMMARY

The systems and methods of the disclosed subject matter provides users with a plurality of data analysis modules that can produce predefined report table/graph and allows the users to modify the format of the report table/graph and select appropriate variables for directly generating publishable tables/graphs. The users do not need to know how to call complex statistical methods or have programming knowledge, thereby they can focus on study of statistical data rather than acquisition thereof.

In one embodiment, a system for generating a statistical analysis output is disclosed. The system receives and processes a set of input from a user to perform statistical analysis and generates an output based on outcomes of the analysis. The user input includes at least one statistical variable selected for analysis from a plurality of statistical variables contained in a dataset, one or more statistical modules adopted for specific analysis, and one or more output formats. The statistical analysis are performed based on the selected statistical modules. The system includes a processing unit configured to: automatically identify each of the plurality of statistical variables in the dataset; for each identified statistical variable, automatically generate a program code for obtaining a variable distribution; select from the identified variables in the dataset at least one statistical variable for statistical analysis based on the variable distribution; if the user input includes a selection of one or more statistical functions for manipulating variables, select one or more of the at least one statistical variable and automatically generate program codes that implement the statistical functions for manipulating the one or more selected variables; automatically perform statistical analysis based on the one or more statistical modules by executing program codes associated with the modules; and automatically generate a program code for organizing outcomes of the statistical analysis into the user selected output formats.

In another embodiment, a method for generating a statistical analysis output is disclosed for a system that receives and processes a set of input from a user to perform statistical analysis and generates an output based on outcomes of the analysis, wherein the user input includes at least one statistical variable selected for analysis from a plurality of statistical variables contained in a dataset, one or more statistical modules adopted for specific analysis, and one or more output formats and wherein the statistical analysis are performed based on the selected statistical modules. The method comprises: automatically identifying each of the plurality of statistical variables in the dataset; for each identified statistical variable, automatically generating a program code for obtaining a variable distribution; selecting from the identified variables in the dataset at least one statistical variable for statistical analysis based on the variable distribution; if the user input includes a selection of one or more statistical functions for manipulating variables, selecting one or more of the at least one statistical variable and automatically generating program codes that implement the selected statistical functions for manipulating the one or more variables; automatically performing statistical analysis based on the one or more statistical modules by executing program codes associated with the modules; and automatically generating a program code for organizing outcomes of the statistical analysis into the user selected output formats.

In another embodiment, logic encoded in one or more tangible media is disclosed. The logic includes code for execution and when executed by a processor is operable to perform operations comprising: receiving a set of input including at least one statistical variable selected for analysis from a plurality of statistical variables contained in a dataset, one or more statistical modules adopted for specific analysis, and one or more output formats; automatically identifying each of the plurality of statistical variables in the dataset; for each identified statistical variable, automatically generating a program code for obtaining a variable distribution; selecting from the identified variables in the dataset at least one statistical variable for statistical analysis based on the variable distribution; if the user input includes a selection of one or more statistical functions for manipulating variables, selecting one or more of the at least one statistical variable and automatically generating program codes that implement the selected statistical functions for manipulating the one or more selected variables; automatically performing statistical analysis based on the one or more statistical modules by executing program codes associated with the modules; and automatically generating a program code for organizing outcomes of the statistical analysis into the user selected output formats.

Embodiments of the disclosed subject matter may include one or more of the following features. For example, the system for generating a statistical analysis output may further include a memory unit coupled to the processing unit for storing the dataset. The memory unit may also store the set of user inputs. The system may also include a communication unit configured to receive the user input from, and transmit the analysis output to, a user device through a communication network, including the Internet. The system may further include a storage unit for storing the analysis output. The processing unit in the system may be further configured to create a data distribution file for storing the variable distributions of the identified statistical variables. The data distribution file may be created by automatically generating a program code for generating the data distribution file, which may maintain a specific format for organizing the variable distributions, including a spreadsheet file format, a text file format, or a graphical file format. The processing unit in the system may be also further configured to categorize the each identified statistical variable as one of a continuous variable and a discrete variable.

Embodiments of the disclosed subject matter may further include one or more of the following features. For example, the system for generating a statistical analysis output may further include a display unit for displaying the variable distribution of the each identified statistical variable through a graphical user interface. The processing unit in the system is further configured to automatically recalculate distribution of the manipulated statistic variables. The user selectable statistical functions for manipulating variables include re-coding, categorizing, and standardizing an existing variable as well as creating a new statistical variable. The processing unit may be further configured to automatically generate a program code, such as SAS or R program codes, for creating a separate dataset that includes the manipulated statistical variables. The processing unit may also be configured to save the analysis output in one or more output files. The processing unit may be configured to use the one or more output files to modify the statistical analysis or to make additional statistical analysis. The processing unit may also be configured to combine the output files containing different instances of the statistical analysis into a new output file.

BRIEF DESCRIPTION OF THE DRAWINGS

FIG. 4 is a block diagram showing a process for generating data analysis output tables and graphs in accordance with one embodiment of the disclosed subject matter.

DETAILED DESCRIPTION OF THE PREFERRED EMBODIMENTS

Figure 1A:
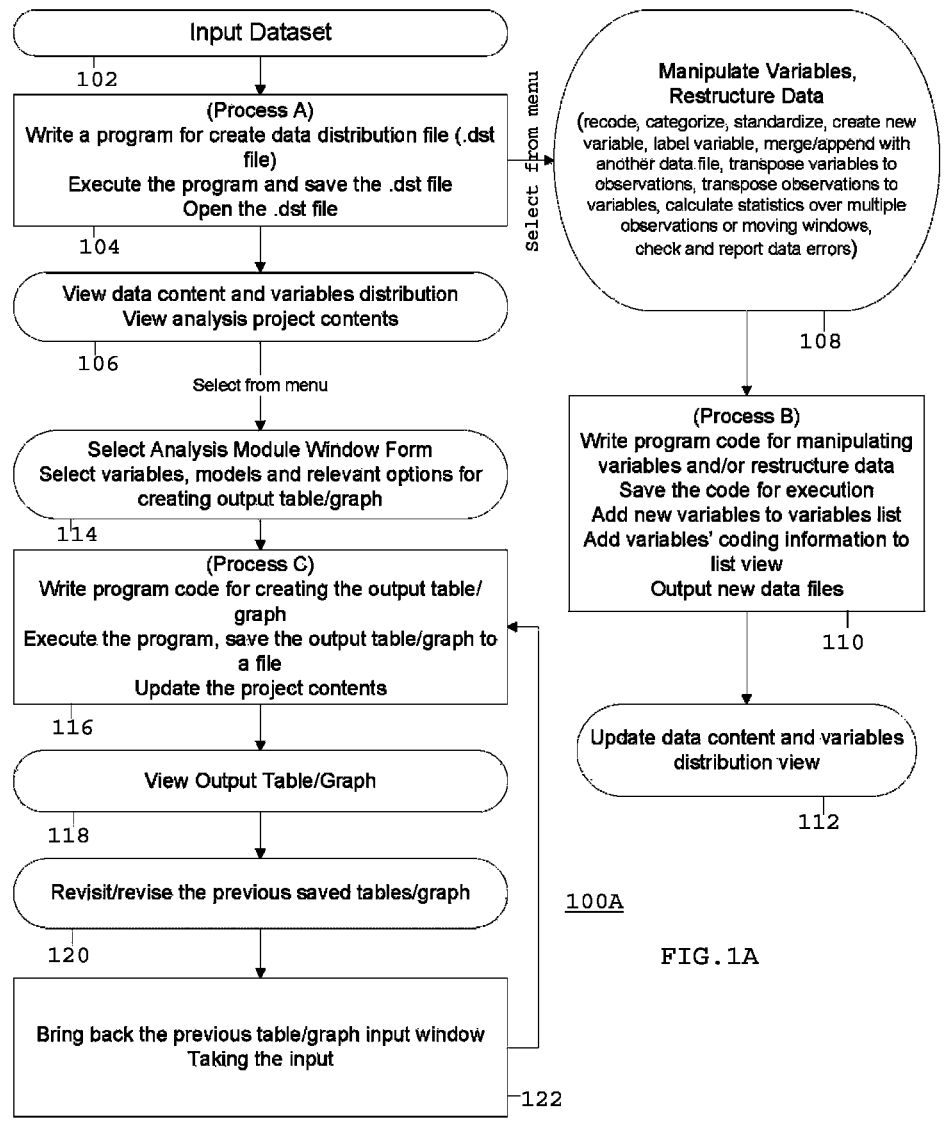
FIG. 1A is a block diagram showing a process of analyzing a statistical dataset in accordance with one embodiment of the disclosed subject matter.

FIG. 1A is a block diagram showing a process 100A of analyzing a statistical dataset in accordance with one embodiment of the disclosed subject matter. Referring to FIG. 1A, an input dataset is received at 102. At 104, a separate program is coded and executed for each variable in the dataset to obtain the distribution of the variable.

In some embodiments, an SAS or R program is automatically coded and executed to provide the distribution of the variables. To obtain the distribution of a continuous variable, such as the age of the subject (AGE), in an exemplary dataset referred to as The_Dataset, for instance, an exemplary SAS program shown below may be coded:

```
PROC UNIVARIATE data = The_Dataset;
    var AGE;
    RUN;
```

To obtain the distribution of a discrete variable, such as the gender of the subject (GENDER), on the other hand, a different program can be coded, as shown below:

```
PROC FREQ data = The_Dataset;
    table GENDER;
    RUN;
```

The programs are coded and executed automatically for each variable contained in a dataset and, therefore, the user does not need to provide programs or have expertise in programming. In some embodiments, other programming or scripting languages, such as R, COBOL, C, C++, Visual Basic, Java, VB Script, and JavaScript, are used to automatically code programs to provide the variable distributions.

Once the distribution of all the variables in the dataset is obtained, a separate program is automatically coded to organize the distribution information to create a data distribution file to store the distribution information. In some embodiments, the data distribution file uses ".dst" extension and maintains a very specific format in organizing the distribution information. The data distribution file used in these embodiments can only be opened by that which embodies the systems or methods of the disclosed subject matter. In other embodiments, the data distribution files are saved in the formats that can be recognized by other data analysis applications, such as a spreadsheet application. The variables contained in a dataset are automatically detected and each variable is categorized as either continuous or discrete. Then the distribution information of each variable is obtained and saved in a data distribution file.

At 106, a direct view of the variables found in a dataset and the distribution of each of the variables are displayed for users. This helps the users get familiar with the data quickly. For instance, users can determine what variables the dataset include and how each variable was coded, decide which variables should be used, and how they should be used.

At 108, a user may select a menu option to manipulate the variables found in the dataset, create new variables, and restructure the data in a dataset. For example, a user is enabled to recode (for discrete variables) or categorize (for continuous variables), and standardize the variables. The user is also enabled to create one or more new variables. For instance, a menu is provided for the user to select a particular function from a plurality of functions, such as recode, categorize, standardize (for an existing variable), and create (for new variables). In some embodiments, the distribution of the manipulated variables is automatically recalculated upon completion of the manipulations. In some embodiments, the distribution of the new variables is also automatically calculated after the variables are created. In some embodiments, the user is also enabled to label the variables.

In some embodiments, the user may also be enabled to transpose variables to observations (e.g., records) or transpose observations to variables, e.g., to calculate statistics over multiple observations or moving windows. In a longitudinal study, for example, in which 200 children have been followed up to measure each child's height at age 2, 4, 6 and 8, the data, as shown in Table 1A, can be initially organized as each child having one record (one line), each record having $ht_2$, $ht_4$, $ht_6$, and $ht_8$ to represent his/her height at age 2, 4, 6 and 8, respectively. Data transposing function enables a user to reshape the data, as shown in Table 1B, e.g., to have each line represent for each measurement such that, whereas the original data had 200 lines, the new data now includes 800 (200×4) lines.

TABLE 1A

| Subject | $Ht_2$ | $Ht_4$ | $Ht_6$ | $Ht_8$ |
|---|---|---|---|---|
| Child 1 | $A_2$ | $A_4$ | $A_6$ | $A_8$ |
| Child 2 | $B_2$ | $B_4$ | $B_6$ | $B_8$ |
| Child 3 | $C_2$ | $C_4$ | $C_6$ | $C_8$ |
| . | | | | |
| . | | | | |
| Child 200 | $Z_2$ | $Z_4$ | $Z_6$ | $Z_8$ |

TABLE 1B

| Subject | Height | Indicator |
|---|---|---|
| Child 1 | $A_2$ | $Ht_2$ |
| Child 1 | $A_4$ | $Ht_4$ |
| Child 1 | $A_6$ | $Ht_6$ |
| Child 1 | $A_8$ | $Ht_8$ |
| . | | |
| . | | |
| Child 200 | $Z_8$ | $Ht_8$ |

In some embodiments, the user may be enabled to merge or append one dataset with another dataset. For example, once the user selects desired variables from at least two different datasets, a program code is automatically generated and executed to provide one coherent dataset. In some embodiments, the program code is automatically generated using the SAS programming language. In other embodiments, the program code is automatically generated using the R programming language, which is an open-source statistical program for data analysis.

Once the user selects a function, then the user is prompted to select one or more variables to be manipulated or to name a new variable to be created. Then one or more programs appropriate for the selected function and variable(s) are automatically coded and executed, or saved for subsequent execution, at 110. Suppose, for example, the user wishes to categorize a continuous variable (e.g., AGE) in a dataset (e.g., The_Dataset) into three equal groups, each of which has the same, or similar, number of subjects (e.g., ageGroup). An exemplary SAS program, in accordance with one embodiment, can be automatically coded, as shown below:

```
PROC RANK data = The_Dataset;
    group = 3;
    RANKS ageGroup;
    RUN;
```

At 112, an updated data content and the corresponding distribution information are saved. In some embodiments, a display of the updated data content and the distribution view is provided to the user.

At 114, analysis output format menus, such as a set of data analysis table and/or graph menus, are provided. For example, a user is allowed to select an analysis module (e.g., Population Description module) and a set of variables (e.g., AGE, HEIGHT, BMI, SMOKE, EDUCATION, OCCUPATION, etc.) that the user wishes to include in the selected analysis module. At 116, the user's inputs are used to automatically code and execute programs for generating a data analysis table/graph. To obtain the mean and standard deviation of a continuous variable (e.g., AGE) classified in a category (e.g., SEX), for example, an exemplary SAS program, as shown below, is automatically coded and executed:

```
PROC MEANS data = The_Dataset;
    var = AGE;
    class SEX;
    RUN;
```

After the programs for generating a data analysis table/graph are executed, a separate program is automatically coded to identify the output from each of the program to format and reorganize the output into a pre-defined table/graph. In some embodiments, the data analysis tables/graphs are saved into output files. In some embodiments, the output files are saved in the formats that can be recognized by applications for displaying and manipulating documents, such as graphics applications and word processor applications.

At 118, the user is provided with a display of the output in the pre-defined table/graph format. At 120, the user is presented with the data analysis table/graph menus again. The user can modify the previous selection by de-select some of the previously selected menu options or by selecting new menu options. At 122, the modified selection of the menu options is received and provided as input for re-generating the data analysis table/graph at 116.

Figure 1B:
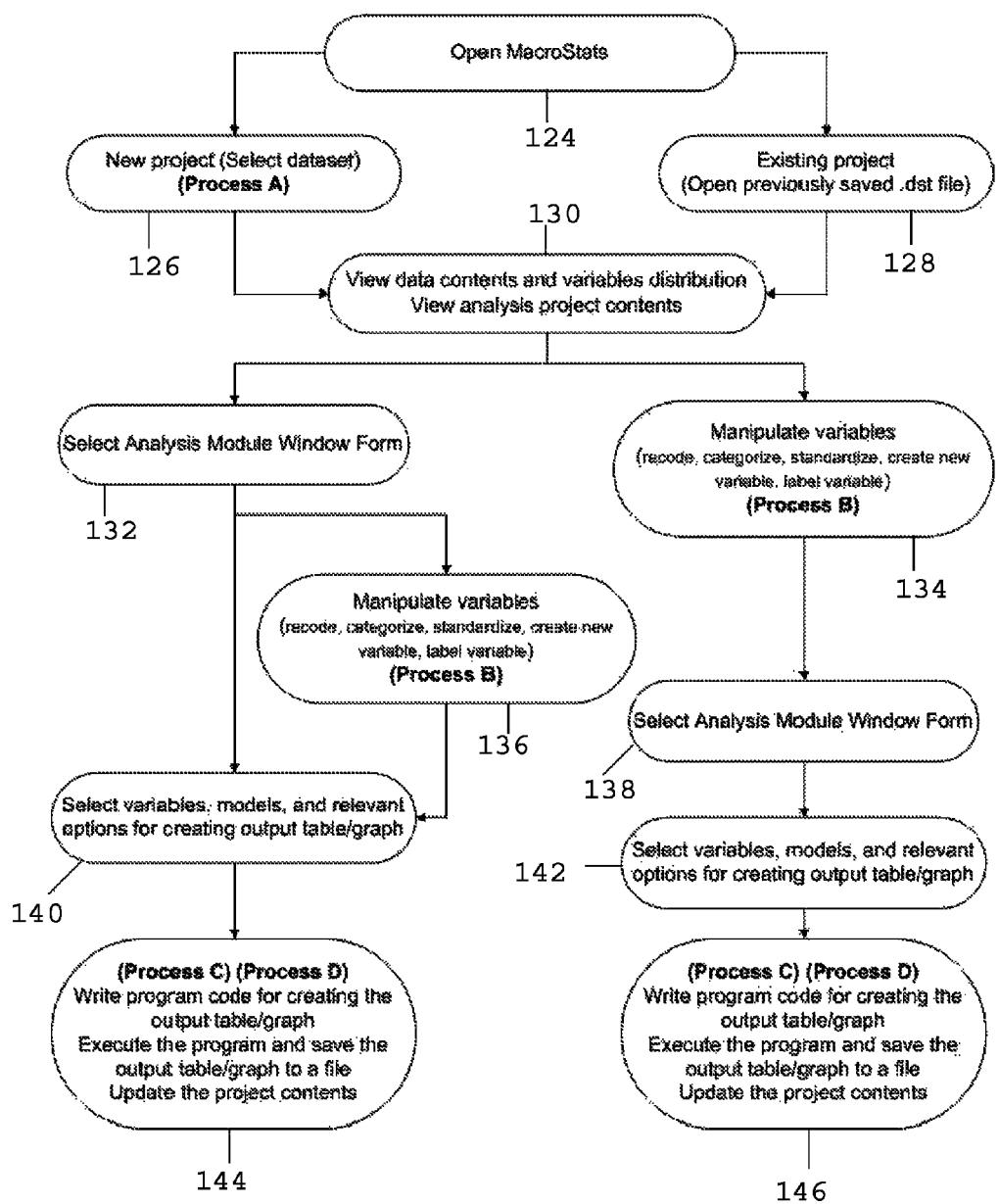
FIG. 1B is a block diagram showing an alternative process of analyzing a statistical dataset in accordance with one embodiment of the disclosed subject matter.

FIG. 1B is a block diagram showing an alternative process 100B of analyzing a statistical dataset in accordance with one embodiment of the disclosed subject matter. FIG. 1B, when compared to FIG. 1A, shows that the process of analyzing datasets can be performed in alternative sequences. A user can at any time (e.g., before or after selecting a test module) manipulate dataset variables (Process B). If the user, for instance, decides after selecting UNIVARIATE module that a new variable is desired, the user can simply create and select a new variable. The user can select multiple variables and perform an analysis using all of the selected multiple variables, or perform multiple analysis using a same test module for each, or selected subsets, of the multiple variables. The user can also select different test modules after selecting desired variables, options, and etc. The user can also select multiple test modules for a set of selected variables, options, etc., wherein it matters not which particular test module is used before or after which other test modules. For example, test module A can come before test module B and vice versa: the particular order has no bearing on the resulting outputs. All analysis outputs can be saved for subsequent use such that the user can at any time recall the saved outputs and make further analysis and modifications.

Referring to FIG. 1B, a user starts a statistical analysis tool, such as MacroStats, at 124. MacroStats is a statistical analysis tool by X&Y Solutions, Inc. that embodies the subject matter of the present invention. MacroStats was designed with a focus on the ease with which a user can obtain data analysis (e.g., selecting desired inputs and obtaining the relevant statistical analysis outputs without having to worry about programming details). Commonly used (e.g., pre-defined) report table formats are classified into several categories (e.g., population description, univariate analysis, stratified analysis, multiple regressions, etc.) to provide a user with options to alter the table outlay (e.g., changing the order of rows, columns, etc.) in each of the several categories. MacroStats provides all available inputs (e.g., variables, options, etc.), takes a user's selections, and automatically codes and executes programs to create desired reports (e.g., tables, graphs, etc.) without requiring further user intervention.

Once the statistical analysis tool is started at 124, if the user wishes to start a new statistical analysis project, the user can select a dataset at 126. At 130, the user can view the data content and corresponding distribution information associated with the dataset. In some embodiments, the content and distribution view also provides a set of data analysis option menus.

At 132, the user can select an analysis module window form for the new data analysis project. At 136, the user can select one or more variables and variable manipulation functions that can cause an automatic coding and execution of programs for manipulating the selected variables. At 140, the user can select one or more variables, analysis modules for statistically analyzing the selected variables, and desired analysis output formats. At 144, programs are automatically coded and executed to carry out the selected statistical analysis of the selected variables and to save the outcome of the analysis in the selected output formats. In some embodiments, the outcome of the analysis is saved to a file.

If, on the other hand, the user wishes to work with an existing project, the user selects a previously saved data distribution file at 128. At 130, the user can view the data content and corresponding distribution information associated with the selected data distribution file. The content and distribution view can provide a set of data analysis option menus in some embodiments. At 134, the user can select one or more variables from the data distribution file content and variable manipulation functions that can cause an automatic coding and execution of programs for manipulating the selected variables. At 138, the user can select an analysis module window form for a different, or revised, data analysis project. At 142, the user can select one or more variables, one or more analysis modules for statistically analyzing the selected variables, and desired analysis output formats. At 146, programs are automatically coded and executed to carry out the selected statistical analysis of the selected variables and to save the outcome of the analysis in the selected output formats. In some embodiments, the data distribution file is updated to save the outcome of the additional analysis.

Table 2 shows a data analysis table generated using an exemplary epidemiological dataset.

TABLE 2

Characteristics of study population

| Characteristics | Male | Female | P Value |
|---|---|---|---|
| N | 366 | 358 | |
| Mean ± SD | | | |
| Age (years) | 38.0 ± 14.7 | 37.8 ± 13.1 | 0.807 |
| Height (m) | 1.6 ± 0.1 | 1.5 ± 0.1 | 0.000 |
| Weight (kg) | 56.6 ± 7.1 | 50.6 ± 6.8 | 0.000 |
| Body mass index (kg/m2) | 21.0 ± 2.0 | 21.5 ± 2.5 | 0.003 |
| N (%) | | | |
| Cigarette smoking | | | 0.000 |
| No | 105 (28.8) | 326 (91.8) | |
| Yes | 260 (71.2) | 29 (8.2) | |
| Education | | | 0.000 |
| Low | 69 (18.9) | 232 (65.2) | |
| Middle | 134 (36.6) | 87 (24.4) | |
| High | 163 (44.5) | 37 (10.4) | |

In some embodiments, the statistical dataset analysis process is implemented as an application program, including a web-based application program. For example, the analysis process can be implemented as a Visual Basic program. In some embodiments, the analysis process is implemented as a plurality of processes that are distributed over a network, such as local area network (LAN), wide area network (WAN), and the Internet, and comprise server processes and client processes, wherein the server processes are designed to perform data analysis and calculations whereas the client processes are designed to provide users with a graphical user interface for receiving user inputs and displaying the outputs of the data analysis. In some embodiments, the application program enables a user to publish one or more analysis outputs, such as output tables and/or graphs, e.g., on the web to share them with other collaborating users, or the general public.

Figure 2:
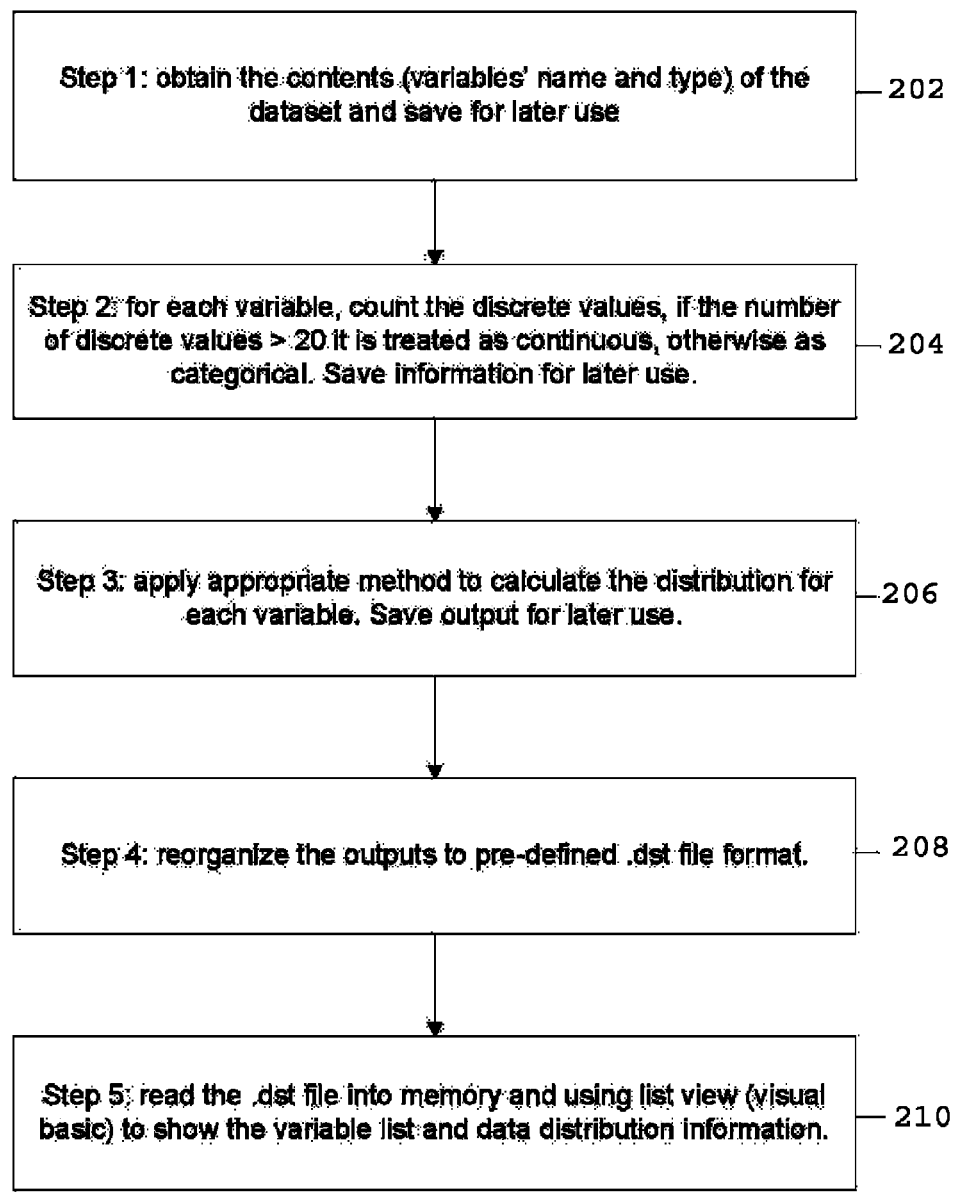
FIG. 2 is a block diagram showing a process for generating distribution information of variables contained in a dataset in accordance with one embodiment of the disclosed subject matter.

FIG. 2 is a block diagram showing a process for generating the distribution information of variables contained in a dataset in accordance with an embodiment of the disclosed subject matter. At 202, each of the variables in a dataset is detected and saved for later use. At 204, the discrete values of each variable are counted to determine whether the variable should be treated as a continuous variable or a discrete variable. In one embodiment, for example, a variable is treated as a continuous variable if the total count of its discrete values exceeds 20. Otherwise, the variable is treated as a discrete, or categorical, variable. At 206, the distribution of each variable is calculated. In some embodiments, one or more SAS programs are automatically coded and executed for calculation of the variable distribution. In other embodiments, one or more R programs are automatically coded and executed for calculation of the variable distribution. At 208, the variable distributions are stored in a data distribution file (e.g., ".dst" file). At 210, the variable distributions are read into memory to show, or provide, a list of the variables and the variable distributions. In some embodiments, the list view of Visual Basic is used to display a list of the variables and the variable distributions.

Figure 3:
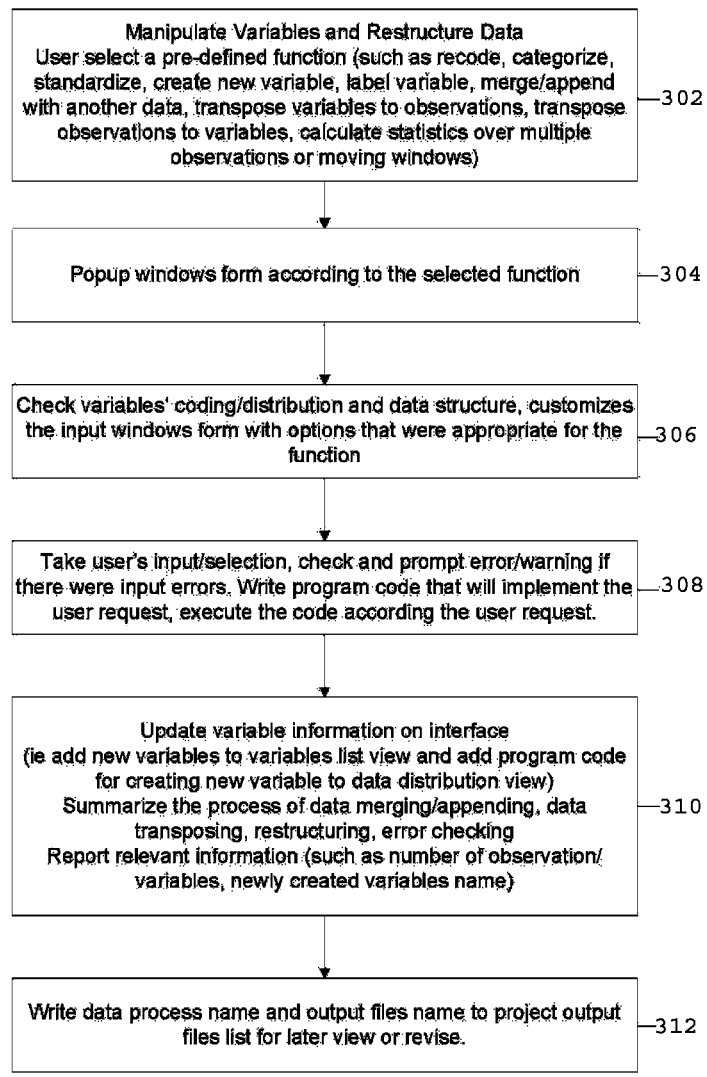
FIG. 3 is a block diagram showing a process for manipulating variables contained in a dataset, for creating new variables, and for restructuring data in accordance with one embodiment of the disclosed subject matter.

FIG. 3 is a block diagram showing a process for manipulating (e.g., recode, categorize, standardize, label, transpose, etc.) the existing variables contained in a dataset or for creating new variables and for restructuring data by merging or appending one dataset with other dataset(s), in accordance with an embodiment of the disclosed subject matter. At 302, a user is prompted, for example, to select one or more variables or datasets and a pre-defined function for manipulating the selected variables, restructuring the selected datasets, or calculating statistics over multiple observations or moving windows. At 306, coding and/or distribution of the selected variables or the variables in the selected datasets are checked. At 308, one or more program codes that can implement the selected manipulation function for the selected variables or datasets are automatically generated. In some embodiments, the user inputs are also checked at 308 for errors and, if errors are present, appropriate error message(s) are provided. In some embodiments, the user's selection of a pre-defined function causes a form window associated with the function to pop up to present the user with selectable variables at 304, and/or options that are appropriate for the selected function at 306.

At 310, the updated variable information is provided on the user interface. For example, the variable list view and the corresponding distribution information are updated if one or more new variables have been added. Also, the process of dataset restructuring, such as merging, appending, transposing, or error checking, is summarized and the relevant information (e.g., number of records/variables, new variables, etc.) is reported. At 312, the updated variable information is saved in output file(s) for later view or revision.

FIG. 4 is a block diagram showing a process for generating data analysis output tables and graphs in accordance with an embodiment of the disclosed subject matter. At 402, a user is prompted to select an analysis module, such as UNIVARIATE analysis and STRATIFIED analysis. In some embodiments, the user can choose an auto-analyzer module instead. At 404, a window form related to the selected analysis module is shown. In some embodiments, a user's selection of an analysis module causes a form window associated with the analysis module to pop up and present the user with the options of selectable variables, output table/graph formats, and other options appropriate for running the selected analysis. In some embodiments, variables, such as outcome variable, exposure variables, and covariates may be pre-selected. At 406, the user is enabled to select a set of variables to be tested as well as the formats and other options for creating output tables/graphs. At 408, the user inputs are checked for errors and, if errors are present, error message(s) are presented to the user.

One or more programs that can generate the output tables/graphs are automatically generated and executed at 410 and 412, respectively. In some embodiments, output file(s) including the program outputs are created and saved at 412 for subsequent use. At 414, outputs from each of the programs are combined and the necessary statistics information is extracted and re-organized to be saved into one or more files, such as HTML files or graphic files. At 416, the files are saved in a project output file list for later view or revision.

Figure 5:
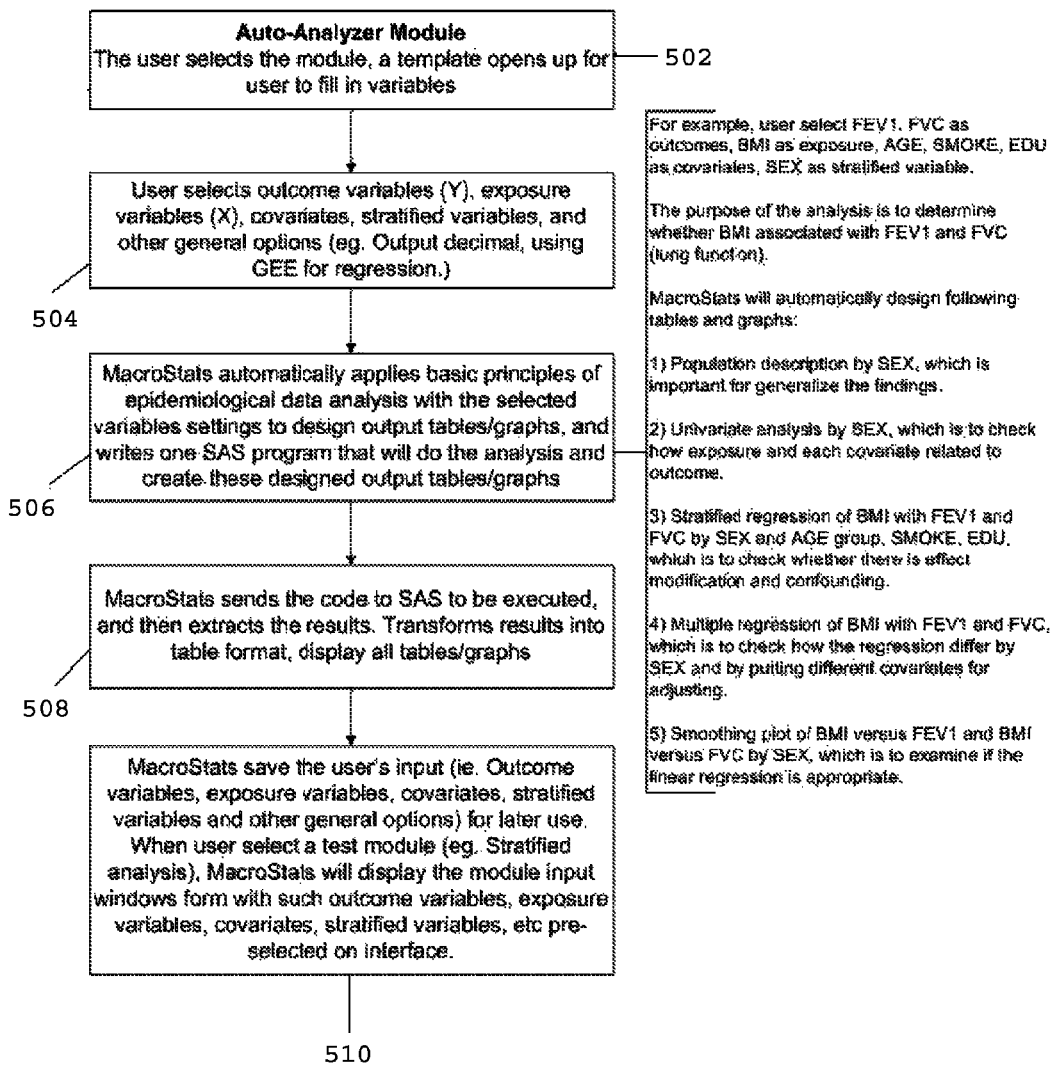
FIG. 5 is a block diagram showing a process for automatically generating data analysis output tables and graphs in accordance with one embodiment of the disclosed subject matter.

FIG. 5 is a block diagram showing a process for automatically generating data analysis output tables and graphs in accordance with an embodiment of the disclosed subject matter. In Process C (shown in FIGS. 1A-B), a user is allowed to select from a plurality of report table formats and graphs, including the ones that are commonly used. In Process D (shown in FIGS. 1A-B), however, the user is also provided with an option to choose an automatic analysis module, such as "Auto-Analyzer Module" of MacroStats. Once the user selects the automatic analysis module at 502, the user is further prompted to select the Outcome, one or more Exposures, Covariates, Stratified Variables, and other general options, such as output decimal and whether to make use of generalized estimating equation (GEE) at 504. After receiving the user input, the Auto-Analyzer Module automatically applies basic principles of data analysis to test the selected hypothesis at 506 (i.e., to determine whether the selected Exposure(s) were associated with the selected Outcome(s), how the association(s) were affected by other Covariates, and how the associations differ amongst the categories of the selected Stratified Variables). At 508, the output tables/graphs are designed, programs that can perform appropriate analysis are automatically coded and executed, and the resulting output tables/graphs are displayed. In some embodiments, the user is allowed to choose different variables for Outcome, Exposures, Covariates, and Stratified Variables, or to choose different options for the same variables. At 510, the user's inputs are saved for later use such that an input windows form with the saved input can be displayed when the user later select a test module.

The systems and methods for generating statistical research information of the present invention is not limited in its application to the details of process and to the arrangements of the components set forth in the description or illustrated in the drawings. The invention is capable of other embodiments and of being practiced and carried out in various ways. Also, it is to be understood that the phraseology and terminology employed herein are for the purpose of description and should not be regarded as limiting. Moreover, certain features which are well known in the art are not described in detail in order to avoid complication of the subject matter of the present invention.

As such, those skilled in the art will appreciate that the conception, upon which this disclosure is based, may readily be utilized as a basis for the designing of other methods and systems for carrying out the several purposes of the present invention. It is important, therefore, that the invention be regarded as including equivalent process to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps and/or functions described herein is not to be considered implying a specific sequence of steps to perform the process. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A system for generating a statistical analysis output, in which the system receives and processes a set of input from a user to perform statistical analysis and generate an output based on outcomes of the analysis, wherein the user input includes at least one statistical variable selected for analysis from a plurality of statistical variables contained in a dataset, one or more statistical modules adopted for specific analysis, and one or more output formats and wherein the statistical analysis are performed based on the selected statistical modules, the system comprising:
a processing unit configured to:
automatically identify each of the plurality of statistical variables in the dataset;
for each identified statistical variable, automatically generate a program code for obtaining a variable distribution;
select from the identified variables in the dataset at least one statistical variable for statistical analysis based on the variable distribution;
if the user input includes a selection of one or more statistical functions for manipulating variables, select one or more of the at least one statistical variable and automatically generate program codes that implement the statistical functions for manipulating the one or more selected variables;
automatically perform statistical analysis based on the one or more statistical modules by executing program codes associated with the modules; and
automatically generate a program code for organizing outcomes of the statistical analysis into the user selected output formats.

2. The system of claim 1, further comprising a memory unit coupled to the processing unit for storing the dataset.

3. The system of claim 2, wherein the memory unit also stores the set of user input.

4. The system of claim 1, further comprising a communication unit configured to receive the user input from and transmit the analysis output to a user device through a communication network.

5. The system of claim 4, wherein the communication network includes the Internet.

6. The system of claim 1, further comprising a storage unit for storing the analysis output.

7. The system of claim 1, wherein the processing unit is further configured to create a data distribution file for storing the variable distributions of the identified statistical variables.

8. The system of claim 7, wherein creating the data distribution file includes automatically generating a program code for generating the data distribution file.

9. The system of claim 7, wherein the data distribution file maintains a specific format for organizing the variable distributions.

10. The system of claim 7, wherein the data distribution file maintains at least one of a spreadsheet file format, a text file format, and a graphical file format.

11. The system of claim 1, wherein the processing unit is further configured to categorize the each identified statistical variable as one of a continuous variable and a discrete variable.

12. The system of claim 1, wherein the processing unit is further configured to automatically recalculate distribution of the manipulated statistic variables.

13. The system of claim 1, wherein the statistical functions include recoding, categorizing, and standardizing an existing statistical variable and creating a new statistical variable.

14. The system of claim 13, wherein the processing unit is further configured to automatically generate a program code for creating a separate dataset that includes the manipulated statistical variables.

15. The system of claim 1, wherein the program codes include SAS program codes and R program codes.

16. The system of claim 1, wherein the processing unit is further configured to save the analysis output in one or more output files.

17. The system of claim 1, wherein the processing unit is further configured to publish the statistical analysis output, if the user input includes a parameter indicating that the user wishes to publish the output.

18. The system of claim 17, wherein the statistical analysis out is published in a web site.

19. A non-transitory computer readable medium containing computer instructions stored therein for causing a computer processor to perform:
receiving a set of input including at least one statistical variable selected for analysis from a plurality of statistical variables contained in a dataset, one or more statistical modules adopted for specific analysis, and one or more output formats;
automatically identifying each of the plurality of statistical variables in the dataset;
for each identified statistical variable, automatically generating a program code for obtaining a variable distribution;
selecting from the identified variables in the dataset at least one statistical variable for statistical analysis based on the variable distribution;
if the user input includes a selection of one or more statistical functions for manipulating variables, selecting one or more of the at least one statistical variable and automatically generating program codes that implement the selected statistical functions for manipulating the one or more selected variables;
automatically performing statistical analysis based on the one or more statistical modules by executing program codes associated with the modules; and
automatically generating a program code for organizing outcomes of the statistical analysis into the user selected output formats.

20. In a system that receives and processes a set of input from a user to perform statistical analysis and generates an output based on outcomes of the analysis, wherein the user input includes at least one statistical variable selected for analysis from a plurality of statistical variables contained in a dataset, one or more statistical modules adopted for specific analysis, and one or more output formats and wherein the statistical analysis are performed based on the selected statistical modules, a method for generating a statistical analysis output, the method comprising:

automatically identifying each of the plurality of statistical variables in the dataset;

for each identified statistical variable, automatically generating a program code for obtaining a variable distribution;

selecting from the identified variables in the dataset at least one statistical variable for statistical analysis based on the variable distribution;

if the user input includes a selection of one or more statistical functions for manipulating variables, selecting one or more of the at least one statistical variable and automatically generating program codes that implement the selected statistical functions for manipulating the one or more variables;

automatically performing statistical analysis based on the one or more statistical modules by executing program codes associated with the modules; and automatically generating, using a computer processor, a program code for organizing outcomes of the statistical analysis into the user selected output formats.

\* \* \* \* \*